Nov. 3, 1942.　　　H. F. DALPAYRAT　　　2,301,021
THERMOCHEMICAL GENERATION OF ELECTRICITY
Filed June 6, 1940
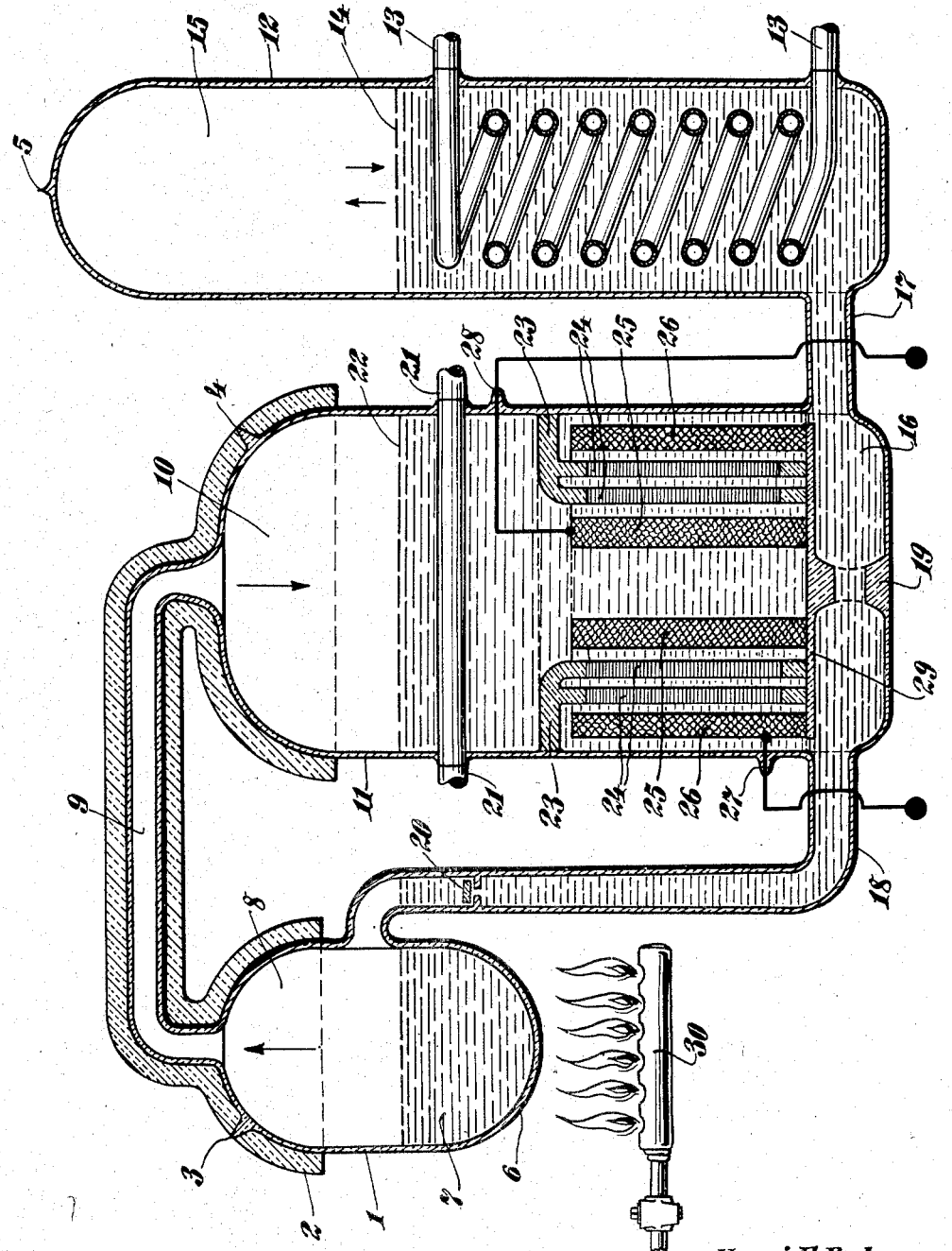
Henri F. Dalpayrat,
INVENTOR
BY
Philip S. M?ran
ATTORNEY Patented Nov. 3, 1942

2,301,021

UNITED STATES PATENT OFFICE 2,301,021

THERMOCHEMICAL GENERATION OF ELECTRICITY

Henri F. Dalpayrat, New York, N. Y.

Application June 6, 1940, Serial No. 339,063

4 Claims. (Cl. 136—83)

The invention here disclosed relates to generation of electric current and involves the forcing of a conducting electrolyte through an insulating porous partition or partitions.

Special objects of the invention are to provide a practical thermochemical method and means for producing polarized ionic concentrations in different parts of an electrolyte and to provide a thermochemical generator, which will operate through utilizing the same substances over and over again without deteriorating of the electrolyte or the electrodes.

Briefly, the invention involves a distillation system, in which rates of vaporization and condensation are maintained unequal to create a vapor pressure which is utilized to force part of the distilled solution from one or a number of porous partitions to effuse ions differentially according to their densities, utilizing the known principle that ionic concentrations formed in different parts of an electrolyte can develop an electrical potential and establish external current.

These electrical effects may be caused by (1) the effusion of occluded ions from porous conducting electrodes as in a gas electrode cell, or (2) by the differential effusion of ions through a porous insulating partition, as in an experimental concentration cell, or (3) by the forced passage of an electrolyte under pressure through a porous insulating partition, as in a pressure cell.

It is known that in the three type of cells mentioned, the rate of discharge of gas electrode cells (1) is too rapid and is but a small part of the energy used during their electrolytic charge. The current output of most concentration cells (2) is too small for commercial purposes. Pressure cells (3) can deliver considerable current if sufficient pressure is applied on a suitable electrolyte to force it through very fine pores in an insulating partition, but this has always involved a high cost and complicated chemical and mechanical arrangements.

It is a broad purpose of this invention to overcome difficulties, such as mentioned and to provide an electrical generator utilizing the pressure cell principle in a distilling system operating economically in a complete cycle.

Other basic objects of the invention are to provide a practical form of generator capable of effecting direct conversion of heat into electricity with high efficiency and wholly without use of mechanical or magnetic devices.

Referring to the ionic charge of a gaseous solution: 1 faraday (about 96,500 coulombs) is a quantity of electricity which is invariably associated with the dissolution, or the electrolysis, of 1 gram-molecule (22.4 liters) of any gas, at normal temperature and pressure of the gas.

The ionic charge of 1 liter of a diatomic and univalent gas such as hydrogen chloride (HCl) when dissolved in water, also at normal temperature and pressure, is therefore:

$$\frac{96,500}{22.4} = 4,303.48 \text{ coulombs}$$

of $H^+$ charges and an equal quantity of $Cl^-$ charges.

It is known that about 400 liters of HCl gas, at normal temperature and pressure, can be dissolved into 1 liter of water at about 25° C., which charges the water with $400 \times 4,308.48 = 1,723,392$ coulombs of $H^+$ charges and an equal quantity of $Cl^-$ charges, or 17,233.92 coulombs of each charge per centiliter of this solution.

It will be evident that a partial separation of the oppositely charged ions contained in as little as 1 milliliter of this solution can give rise to large electrical effects, especially if these polarized ionic concentrations can be produced and accumulated continuously and at a constant rate per unit time.

This can be accomplished in the present invention because the rate of effusion of liquid ions forced through a porous insulating partition varies inversely as the square root of their densities.

The difference in rates of effusion of liquid ions stated above is approximately correct when a conducting electrolyte subjected to mechanical or vapor pressure is forced through an insulating porous partition, and should not be confused with the mobilities of different ions, and the electrostatic or electro-osmotic attraction, or pressure present in ordinary concentration cells utilizing a porous partition.

Although hydrochloric acid may be selected as a suitable electrolyte for this invention, it should be apparent that greater differentiations in ionic effusions can be obtained by choosing solutions having ions of very dissimilar densities as in a salt formed of a gas and a heavy metal, such as potassium chloride or mercurous chloride, etc., or as in solutions having larger aggregations of ions such as trichloracetic acid, or tetrachloracetic acid, etc.

The solution used could also contain, whenever practically possible, a certain percentage of easily vaporized and easily condensed substance or gas, methyl chloride for example, in order to produce a higher vapor pressure or permit a reduction of the intensity of the heat source used for vaporization.

The cooling system used in the invention may utilize a continuous circulation of cold water or another refrigerant, or it may form a part of a circuit of a heat absorption system similar to those now being used in the well known gas flame operated refrigerators.

In this last case a part of the heat applied to the vaporization chamber could be used to operate the absorption cooling device.

The heat source used at the vaporization chamber may have a constant intensity or it may be varied periodically by a timed, clock like device, or otherwise, in order to increase periodically the vapor pressure produced in the distilling apparatus and accelerate the passage of the electrolyte through one or more porous partitions, all within the scope of the method and without departing from the spirit and intent of the present invention.

Accordingly, in the present invention, continuous current is generated by distilling an electrolytic solution in one chamber in a closed vessel, partially condensing the vapors of distillation in another chamber adjacent to the vaporization chamber, and utilizing the remaining vapor pressure existing between these two chambers to force a part of the solution through one or several porous insulating partitions, and discharging the effused solution into a cooled chamber partially evacuated and practically free or devoid of gases or vapors.

The electrical charges are collected by electrodes unable to combine chemically with the solution used, such as carbon, or platinum, or tungsten, or other metals. These electrodes are porous or perforated or made of metallic wire cloth and are placed on each side of a porous partition when a single partition is used.

When several porous partitions are used, coaxially or otherwise disposed, the solution contained between any two adjacent partitions will remain nearly electrically neutral, when the quantity of ions of one polarity arriving in the solution equals the quantity of ions of the same polarity leaving that solution.

This tends to eliminate or reduce the undesirable repulsion and attraction effects of the electrical field surrounding the insulating partition, caused by an excess of one kind of ions within the pores of the partition, which directly opposes the passage of the ions desired through the pores of that partition.

The electrical potential developed and due to the selective adsorption of ions by a solid substance is outlined in Professor Colin G. Fink's book entitled "Electro-chemistry" on pages 154 and 155, and in the same book, the electrical effect following an excess of one kind of ions is also explained on page 49.

The various effects of porous partitions upon electrolytes are explained by Professor G. W. de Tunzelmann in his book entitled "A Treatise on Electrical Theory" on pages 247 and 248.

Referring back to the introductory descriptive part of the invention: When the solution in the heated chamber is all vaporized and a certain amount of the vapors are condensed in the adjacent cell chamber, the vapor pressure between these two chambers decreases, causing a valve to open, allowing the excess of solution in the cooled chamber to flow back into the vaporization chamber, thus completing a continuous cycle of operations.

The size of the vaporization chamber and the amount of solution contained therein determine the length of time necessary for complete vaporization and the frequency of vibration of the valve controlling the solution inlet.

The rate at which the vaporization chamber is re-filled might be once a second, or once a minute, etc., depending upon the size of the vaporization chamber and the size of the cooled tank or reservoir, which stores up temporarily the solution forced through the porous partition structure.

In the accompanying drawing forming part of this specification, one simple embodiment of the invention is illustrated in a single view, constituting a broken sectional and partly diagrammatic representation of one form of the generator.

In the illustration, the reference numeral 1, indicates a closed vessel of refractory glass partially thermally insulated by covering 2, air evacuated and partly filled with an electrically conductive electrolyte (entered through nipples 3, 4 and 5, which remain sealed thereafter).

The details of a refrigeration system have been omitted for the sake of brevity and clarity.

The heated vaporization chamber 6, contains a portion of the solution in lower part 7, and has its upper part 8, discharging its vapor contents through manifold 9, into the upper part 10, of chamber 11, hereinafter called the generator chamber.

The vapor chamber of the device consists of the communicating vessels 8, 9, and 10. Chamber 12, is a solution storage tank cooled by a condenser 13, and has its solution level 14, constantly displaced up or down. The upper part 15, of chamber 12, is evacuated of air, vapors or gases, and is sufficiently cooled by the condenser 13, to prevent the solution contained in this chamber from liberating gases or vapors, in order not to interfere with the displacement of said solution.

The solution in storage tank 12, is in liquid contact with the solution in lower part 16, of generator chamber 11, through conduit 17, and in liquid contact with the solution in inlet conduit 18, through a perforated glass support 19.

The intake of solution from conduit 18, into vaporization chamber 6, is controlled intermittently by a ground-glass valve 20, which is actuated by variations in vapor pressure in chambers 8, 10, and conduit 9.

The solution in generator chamber 11, is cooled near its surface 22, by a condenser 21, of limited physical dimensions and not sufficiently cold to cause complete condensation of the vapors. A part of the vapors coming into contact with partially cooled solution surface 22, is absorbed and dissolved therein.

A glass cylinder 23, separates the upper solution from the lower solution in this chamber. A portion of cylinder 23, consists of a porous glass wall or walls 24, surrounded internally and externally by metallic cloth or other perforated elecctrodes 25, and 26.

27 and 28 are fused glass nipples passing the electrical wire connections of electrodes 25, and 26, to the external utilization circuit. The electrodes rest upon a glass disc 29, welded to the bottom of cylinder 23, and welded to the perforated support 19. 30 is a source of heat of constant, or of variable intensity, used for vaporizing the solution in chamber 6.

When this solution is being vaporized, the vapor pressure exerted downward in chamber 6, over the solution in conduit 18, causes valve 20, to close and stop the inflow of solution into chamber 6. The vapor is thus localized and distributed between chamber 6, and chamber 11 where its expanding volume repels solution 22 downward. A part of the solution displaced is forced through the pores of the porous glass partition 24, causing an excess of ions of one polarity to be accumulated on one side of this partition while an excess of ions of another polarity is accumulated on the other side of this partition.

The electrical potential thereby imparted to the electrodes 25, and 26, depends upon the nature of the electrolyte employed and whether more positive or more negative ions will go through the partition. The electrical current available for utilization depends upon: the ionic concentration of the solution, the number of ions contained in the quantity of solution forced through the partition per unit time, depending upon the vapor pressure, or other pressure and depending upon the ionic differentiation caused by the forced effusion which is approximately at a rate varying inversely as the square root of the densities of the ions being effused under pressure through the porous partition.

The electrodes immersed in the polarized concentration areas acquire an electrical potential and are capable of delivering a continuous electronic current through the external conductive circuit, in the same manner as electrodes which are in polarized ionic concentration areas in a gas electrode cell, produce a continuous current.

Special advantage of the invention over ordinary gas electrode cells is that, through the method described and examplarily illustrated in the drawing, the current produced can be made constant and of much larger magnitude, depending upon the pressure used and other factors previously mentioned.

The solution effused through the porous partition 24, is displaced by the vapor pressure in 10, downward in chamber 11, then through conduit 17, then is displaced toward the upper part 15, of chamber 12, where it continues to rise as long as there is some solution in chamber 6, being vaporized.

When solution 7 is all vaporized and a sufficient quantity of the vapors has condensed in the generator chamber 11, the vapor pressure in 8, 9, and 10 is reduced; valve 20 is then opened by the weight of the column of liquid above its level contained in storage tank 12.

The solution then flows from tank 12, through conduit 17, through lower part 16, of chamber 11, through perforated support 19, and along conduit 18, which latter discharges the solution into the vaporization chamber for re-vaporization.

Thus a cycle of operations is completed and can be repeated over and over again as long as a difference is maintained between the rate of vaporization and the rate of condensation, or the device is otherwise controlled by periodically varying the intensity of the heat source or varying the rate of cooling of some parts, or intermittently and alternately heating some parts and cooling others, all within the scope of this invention.

The use of parallel porous insulating partitions 24, as indicated is preferred because of the fact that this construction provides a substantially electrically neutral electrolyte between the highly polarized areas at the electrodes at opposite sides of said porous partitions.

What is claimed is:

1. In apparatus of the character disclosed, the combination of an electrolyte distillation device, a condensing chamber connected to receive the vapor from said distillation device, a porous insulating partition separating portions of said condensing chamber and said condensing chamber having a flow passage at the bottom of the same and at that side of the porous insulating partition to enable pressure of uncondensed vapor in the top of said chamber to force condensed electrolyte through said porous insulating wall and electrodes in the condensed electrolyte at opposite sides of said porous insulating wall and provided with external circuit conducting means.

2. In apparatus of the character disclosed, the combination of an electrolyte distillation device, a condensing chamber connected to receive the vapor from said distillation device, a porous insulating partition separating portions of said condensing chamber and said condensing chamber having a flow passage at the bottom of the same and at that side of the porous insulating partition to enable pressure of uncondensed vapor in the top of said chamber to force condensed electrolyte through said porous insulating wall and electrodes in the condensed electrolyte at opposite sides of said porous insulating wall and provided with external circuit conducting means, a pressure storage chamber connected with said condensing chamber and a return connection from said chambers to said distillation device, including valve means for passing condensed electrolyte from said chamber back to said distillation device on reduction of vapor pressure in said distillation device.

3. In apparatus of the character disclosed, the combination of a heated electrolyte distilling chamber, a condensing chamber, a vapor connection from the top of the distillation chamber to the top of the condensing chamber, a pressure storage chamber, liquid conducting connections between the bottom portions of said three chambers, separate electrodes in said condensing chamber and an insulating partition in said condensing chamber having a portion porous to the condensed electrolyte, said partition being disposed between said electrodes and through said porous portion providing flow of liquid electrolyte under pressure of uncondensed vapor in the top of the chamber into said lower condensed electrolyte connections.

4. In apparatus of the character disclosed, the combination of an electrolyte distillation device, chamber means for condensing vaporized electrolyte and for containing the condensed electrolyte, said chamber means being connected to receive vaporized electrolyte from and to return condensed electrolyte to said electrolyte distillation device, a porous insulating partition separating condensed electrolyte containing portions of said chamber means and electrodes in the condensed electrolyte at opposite sides of said porous insulating partition and provided with external circuit conducting means.

HENRI F. DALPAYRAT.